(12) United States Patent
Grabarnik et al.

(10) Patent No.: US 7,657,627 B2
(45) Date of Patent: *Feb. 2, 2010

(54) SYSTEM AND PROGRAM PRODUCT FOR THROTTLING EVENTS IN AN INFORMATION TECHNOLOGY SYSTEM

(75) Inventors: Genady Grabarnik, Thornhill (CA); Sheng Ma, Briarcliff Manor, NY (US); Chang-Shing Perng, Bedford Hills, NY (US); David H. Thoenen, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/027,369

(22) Filed: Feb. 7, 2008

(65) Prior Publication Data

US 2008/0133750 A1   Jun. 5, 2008

Related U.S. Application Data

(63) Continuation of application No. 10/464,997, filed on Jun. 19, 2003, now Pat. No. 7,392,311.

(51) Int. Cl.
*G06F 15/173* (2006.01)
*G06F 15/16* (2006.01)

(52) U.S. Cl. ................ 709/224; 709/207; 709/223

(58) Field of Classification Search ............ 709/207, 709/223, 224

See application file for complete search history.

(56) References Cited

U.S. PATENT DOCUMENTS 6,502,131 B1 * 12/2002 Vaid et al. ............ 709/224
6,539,428 B2 * 3/2003 Davies ................ 709/224
6,823,381 B1 * 11/2004 Harper ................ 709/224
7,076,543 B1 * 7/2006 Kirti et al. ............ 709/223

FOREIGN PATENT DOCUMENTS

| JP | 2001069097 A | 1/2001 |
|----|--------------|--------|
| JP | 20002042357 A | 9/2002 |

OTHER PUBLICATIONS

Tay et al., "Performance Optimization of Throttled Time-Warp Simulation", Proceedings of 34th Annual Simulation Symposium, Apr. 22-26, 2001, Seattle, Washington, pp. 211-218.

(Continued)

*Primary Examiner*—Hussein Elchanti
(74) *Attorney, Agent, or Firm*—Douglas Lashmit; Hoffman Warnick LLC

(57) ABSTRACT

A system and program product for generating throttling parameters for an information management (IT) system based on historical event log data. An embodiment of the system comprises: an identification system that examines the historical event log data and identifies throttling candidates, wherein each throttling candidate comprises an event type for redundant events that reoccur over at least one measured time period; and an analysis system that statistically analyzes event data associated with each throttling candidate and generates a set of throttling parameters for each throttling candidate based on the event data.

19 Claims, 2 Drawing Sheets

OTHER PUBLICATIONS

Young et al., "Optimism: Not Just For Event Execution Anymore", Proceedings of Thirteenth Workshop on Parallel and Distributed Simulation, May 1-4, 1999, Atlanta, Georgia, pp. 136-143.

Jones et al., "Combining Optimism Limiting Schemes In Time Warp Based Parallel Simulations", 1998 Winter Simulation Conference Proceedings, Dec.13-16, 1998, Washington, D.C., USA, pp. 499-505.

Tay et al., "Speculative Parallel Simulation with an Adaptive Throttle Scheme", Document No. 1084-4097/97, IEEE 1997, pp. 116-123.

Ferscha et al., "Probabilistic Adaptive Direct Optimism Control in Time Warp", Document No. 0-8186-7120-3/95, IEEE 1995, pp. 120-129.

* cited by examiner

SYSTEM AND PROGRAM PRODUCT FOR THROTTLING EVENTS IN AN INFORMATION TECHNOLOGY SYSTEM

CLAIM OF PRIORITY

This continuation application claims priority to U.S. patent application Ser. No. 10/464,997, entitled SYSTEM AND METHOD FOR THROTTLING EVENTS IN AN INFORMATION TECHNOLOGY SYSTEM, filed on Jun. 19, 2003 now U.S. Pat. No. 7,392,311, the contents of which are hereby incorporated by reference in their entirety.

BACKGROUND OF THE INVENTION

1. Technical Field

The present invention relates generally to handling events in an information technology system, and relates more specifically to a system and program product for generating throttling parameters from historical event log data.

2. Background Art

In order to ensure that an information technology (IT) infrastructure is operating efficiently, systems must be utilized that look for and report problems or potential problems from IT resources. These problems, referred to generically as "events," generally comprise a message issued by an IT resource in accordance with some predefined protocol. For instance, an event can occur whenever file system utilization exceeds some predetermined threshold value, e.g., 85%.

One of the most dramatic issues facing implementers of IT infrastructure management systems is event volume. Many managers of IT systems report that the volume of events reaching their event management software exceeds one million or more events per day. One may assume that daily "mega-event" volumes is a normal characteristic of many users' IT operating environment. The result is that these high volumes of events require significant system resources to process. And, importantly, these event volumes significantly impact the response time and efficiency, and therefore the value, of users' event management systems. Accordingly, reducing event volumes is a high priority requirement for IT infrastructure managers.

One of the critical issues faced is the frequency with which individual events or sets of events may be reissued as a result of infrastructure failures. Many IT resources 30 are notorious for repetitively emitting the same event or sets of events tens, hundreds, or even thousands of times within very short time frames. It is not unusual for an IT resource to reissue the same event many times per second, flooding networks, systems, and event management software with a cascade of redundant and therefore unnecessary information. Accordingly, a key to reducing the volume of events flooding the system, and therefore enhancing the efficiency of the system, is addressing and reducing the numbers of redundant events reaching the management platforms.

The term "throttling" refers to the practice of recognizing and filtering redundant events from the event stream. A significant body of throttling logic must be designed and deployed to handle the issue of redundant events. Throttling logic for event correlation engines is notoriously difficult to design. This puts an enormous burden upon the event management design and maintenance process.

Moreover, it is well understood that the IT industry is guilty of forcing upon the user a broad range of proprietary and standardized event protocols, log file formats, and (even within a single protocol) syntax. The variety of formats adopted by event messages adds considerable complexity to the user's event environment and therefore adds to the effort required for "manual" analysis and determination of rules for throttling of redundant events.

To further exacerbate the challenge, the torrent of events generated across the user's IT environment is composed of thousands of unique event types, each requiring unique throttling logic and actions.

To summarize, many IT managers contend with more than a million events per day. Their event streams contain a multitude of differing data protocols and formats. The individual events within these event streams represent thousands of unique event types. Many of these event types are likely to be issued in high volume bursts of repetitive patterns.

The scale and complexity of this environment presents an enormous obstacle to the user when considering the effort required for manual analysis of event throttling parameters. Labor-intensive approaches to the analysis of this mass of event data over any meaningful analytical time frame will not produce significant reduction in event volumes. This environment dictates that the event throttling analysis be supported with intelligent, automated facilities for gigabyte data reduction, repetitive pattern recognition, and throttling parameter analysis.

SUMMARY OF THE INVENTION

The present invention addresses the above mentioned problems as well as others by providing a system and program product for generating throttling parameters for an information technology (IT) management system based on historical event log data. In a first aspect, the invention provides a system for generating throttling parameters for an information technology (IT) management system based on historical event log data, comprising: an identification system that examines events in the historical event log data and identifies throttling candidates, wherein each throttling candidate comprises an event type for a series of redundant events that reoccur over at least one measured time period; and an analysis system that statistically analyzes event data associated with each throttling candidate and generates a set of throttling parameters for each throttling candidate based on the event data.

In a second aspect, the invention provides a program product stored on a recordable medium for generating throttling parameters for an information technology (IT) management system based on historical event log data, comprising: means for examining the historical event log data and identifying throttling candidates, wherein each throttling candidate comprises an event type for redundant events that reoccur over at least one measured time period; and means for statistically analyzing event data associated with each throttling candidate and generating a set of throttling parameters for each throttling candidate based on the event data.

In a third aspect, the invention provides a method for generating throttling parameters for an information technology (IT) management system based on historical event log data, comprising: examining the historical event log data and identifying throttling candidates, wherein each throttling candidate comprises an event type for redundant events that reoccur during at least one measured time period; statistically analyzing event data associated with each throttling candidate; and generating a set of throttling parameters for each throttling candidate based on the event data.

In a fourth aspect, the invention provides an information technology (IT) management system, comprising: a database for storing historical event log data; an identification system that examines the historical event log data and identifies throttling candidates, wherein each throttling candidate comprises an event type for redundant events that reoccur over at least one measured time period; an analysis system that statistically analyzes event data associated with each throttling candidate and generates a set of throttling parameters for each throttling candidate based on the event data; and a throttling system for filtering events from the IT management system based on the throttling parameters.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE INVENTION

Figure 1:
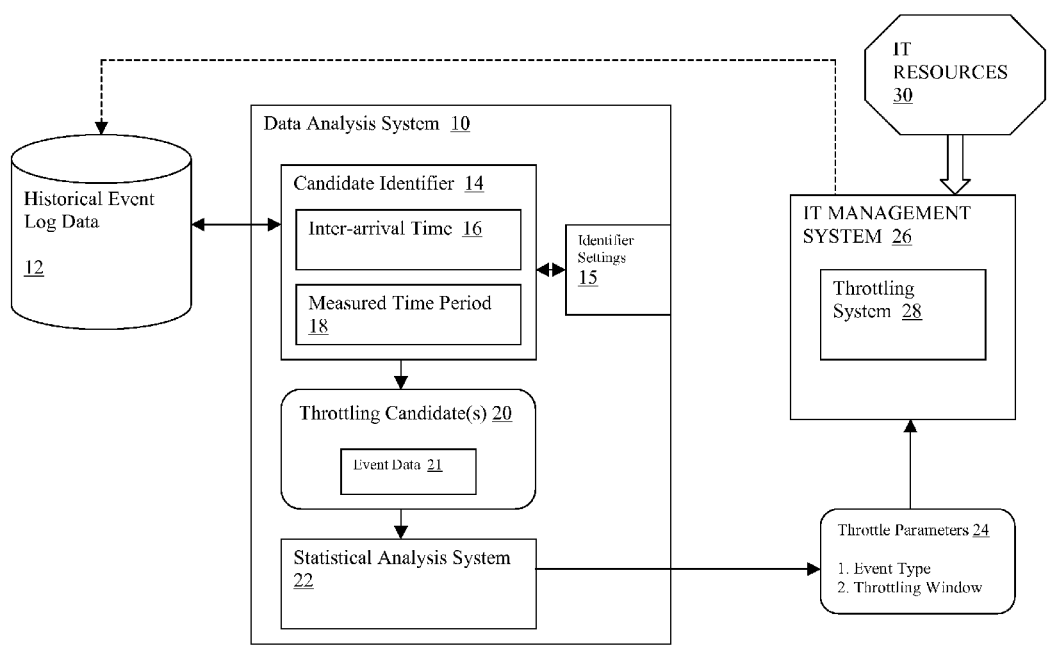
FIG. 1 depicts an overview of a system for generating throttling parameters for an information technology (IT) management system based on historical event log data in accordance with the present invention.

Referring now to the drawings, FIG. 1 depicts a data analysis system 10 for generating throttling parameters 24 for an information technology (IT) management system 26 based on historical event log data 12. In an alternate embodiment (not shown), IT management system 10 could include the data analysis system 10 as an integrated component. Data analysis system 10 could be implemented in any manner, e.g., with a computer system having memory and a processor that executes one or more software programs. Accordingly, in one embodiment, data analysis system 10 could be implemented as a program product executable on a general or specific use computer.

Throttling parameters 24 are used by the throttling system 28 to throttle events received from IT resources 30. "Throttling," as noted above, refers the practice of identifying/filtering/removing events reported from IT resources 30 in order to reduce the amount of event information handled by the IT management system 26.

Historical event log data 12 may typically comprise a database of past events, recorded, received or processed by IT management system 26 (i.e., stored events). Additionally, historical event log data 12 could comprise event data recorded from other sources, e.g., historical data collected from other IT management systems, etc. Each stored event generally comprises a message that reports an IT resource problem. Each message may include information such as the time of the event, the event type, etc. The event type typically refers to some specific problem generated by some specific IT resource. For instance, an event type may comprise an I/O failure for a communication device, a memory warning for a storage device, etc. It is understood that any number, type, content and format of the stored events can be used without departing from the scope of the invention.

Data analysis system 10 includes a candidate identifier 14 that examines the historical event log data 12 and identifies throttling candidates 20. A throttling candidate 20 is generally identified whenever redundant events, i.e., the same type of events, reoccur over one or more measured time periods. More particularly, candidate identifier 14 identifies throttling candidates 20 based on: (1) an inter-arrival time analysis 16, i.e., how often did the redundant events occur; and (2) a measured time period analysis 18, i.e., how long of a time frame did the redundant events reoccur for. For instance, if the same device reports the same problem every 30 seconds for an hour, the inter-arrival time would be 30 seconds, and the measured time period would be one hour. These values can then be examined and/or compared to some predefined identifier settings 15 by candidate identifier 14 to determine if the occurrences of these redundant events qualify as a throttling candidate 20.

As noted, specific control over candidate identifier 14 can be achieved with identifier settings 15. Identifier settings 15 are utilized to set specific boundaries and logic for determining what constitutes a throttling candidate for an event type. For instance, for a particular event type, identifier settings 15 may require that in order to qualify as a candidate, the inter-arrival time must be one minute or less AND that the measured time period must be at least thirty minutes. In another case, identifier settings 15 may require that the inter-arrival time be five seconds or less AND that the measured time period be 120 seconds. The specific settings and logic can be selected or implemented in any manner, including manually or by an automated system.

Once a throttling candidate 20 is identified, its associated event data 21 is captured and passed to statistical analysis system 22. The event data 21 generally comprises the event type, the inter-arrival time, and the measured time period. In some instances, candidate identifier 14 may detect several occurrences or "cases" of an event type that reoccurs at different times in the historical event log data 12. For instance, a redundant event type may be identified as lasting 60 minutes during a first date/time, 90 minutes during a second date/time, and 120 minutes during a third date/time. When multiple cases are detected, the event data 21 will include details from each case. For instance, a simple example of event data 21 having multiple cases may be as follows:

Candidate 1:

| Event Type: 001 (Memory overflow warning on Device 0x0010) | | |
| --- | --- | --- |
| | Inter-arrival Time | Measured time period |
| Case 1: | 30 seconds | 60 minutes |
| Case 2: | 30 seconds | 90 minutes |
| Case 3: | 35 seconds | 120 minutes |

Note that additional data, such as time and date information, identifier names, etc., could likewise be included as part of the event data 21. Once the event data 21 is compiled, it is passed to statistical analysis system 22. Statistical analysis system 22 uses an algorithm to calculate throttling parameters 24 for each throttling candidate 20. The types of throttling parameters 24 will largely be determined by the requirements of throttling system 28 of IT management system 26. In an exemplary embodiment, the throttling parameters 24 for a throttling candidate include: (1) the event type, and (2) a throttling window for the event type. The throttling window determines a time frame during which throttling system 28 will throttle or discard redundant events. In the simple example above, the throttling window may be calculated as the average of the three measured time periods, i.e., 90 minutes. Obviously, different statistical analysis algorithms for calculating a throttling window could be utilized without departing from the scope of the invention. Moreover, the number and types of throttling parameters 24 are not limited.

As noted, the throttling parameters 24 are passed to the throttling system 28 of IT management system 26. As noted, each throttling candidate 20 includes a unique set of throttling parameters 24. Each set of throttling parameters 24 is utilized by throttling system 28 to throttle the recordation, storage, and/or processing of redundant events. For example, in the case where the throttling parameters 24 include an event type (e.g., event type 001) and throttling window (e.g., 90 minutes), throttling system 28 would look for reported events from IT resources 30 that match the event type. If the throttling system 28 detected repeated occurrences of the event type, it would keep one or more of the first few occurrences, and then throttle any future occurrences until the throttling window expired. The throttling window would typically commence after the first occurrence was detected. Thus, in the above example, if an occurrence of an event that matched event type 001 was detected at time T, then any occurrences detected after the first few occurrences would be discarded until time T+90 minutes.

Figure 2:
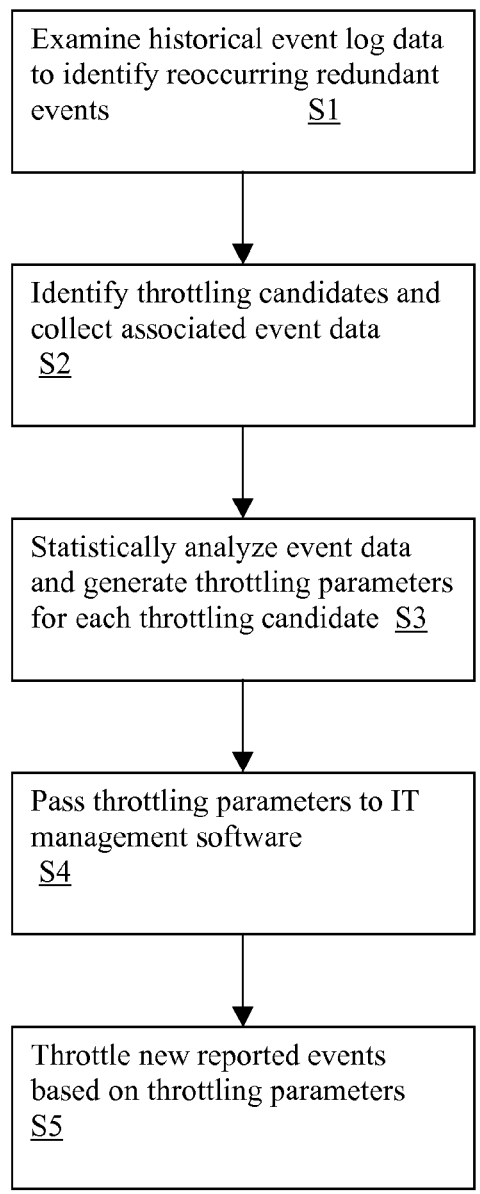
FIG. 2 depicts a flow diagram of a method of implementing the invention.

Referring now to FIG. 2, an overview flow chart of invention is shown. In the first step S1, historical event log data is examined to identify reoccurring redundant events. Next, at step S2, throttling candidates are identified from the examined data, for example, when the event data, e.g., the inter-arrival time and measured time periods, of redundant events meet predetermined settings. At step S3, the event data is statistically analyzed and throttling parameters are generated for each throttling candidate. At step S4, the throttling parameters are passed to the IT management software. Finally, at step S5, new events, received from IT resources, are throttled based on the throttling parameters.

It is understood that the components of the present invention can be realized in hardware, software, or a combination of hardware and software. Any kind of computer system—or other apparatus adapted for carrying out the methods described herein—is suited. A typical combination of hardware and software could be a general purpose computer system with a computer program that, when loaded and executed, carries out the methods described herein. Alternatively, a specific use computer, containing specialized hardware for carrying out one or more of the functional tasks of the invention could be utilized. Aspects of the present invention can also be embedded in a computer program product, which comprises all the features enabling the implementation of the methods described herein, and which—when loaded in a computer system—is able to carry out these methods. Computer program, software program, program, module, mechanism or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A computerized system for generating throttling parameters for an information technology (IT) management system based on historical event log data, comprising:
  an identification system examining events in the historical event log data, wherein an event comprises a message issued by an IT resource in accordance with a predefined protocol and identifies throttling candidates by comparing how often the event reoccurs and a measured time period analysis that measures how long of a time frame the event reoccurred with predefined identifier settings, wherein each throttling candidate comprises an event type for a series of redundant events that reoccur over at least one measured time period;
  an analysis system implemented on at least one computer device for statistically analyzing event data associated with each throttling candidate and generating a set of throttling parameters for each throttling candidate based on the event data wherein the set of throttling parameters include a throttling window which determines a time frame during which the redundant events are discarded;
  a throttling system detecting and recording occurrence of the event type and discarding future occurrences of the event type until the throttling window has expired; and
  a system passing the set of throttling parameters to the IT management system for throttling of a set of new events, based on the set of throttling parameters.

2. The system of claim 1, wherein the throttling candidates are identified by examining the inter-arrival time of redundant events.

3. The system of claim 1, wherein the throttling candidates are identified by examining the at least one measured time period during which redundant events occurred.

4. The system of claim 1, wherein at least one throttling candidate comprises an event type that reoccurred over a plurality of different measured time periods.

5. The system of claim 1, wherein the event data associated with each throttling candidate includes:
  the at least one measured time period during which redundant events reoccur; and
  an inter-arrival time of the redundant events occurring during each at least one measured time period.

6. The system of claim 1, wherein the throttling parameters for each throttling candidate comprise an event type and a throttling window.

7. A computer program product stored on a computer-readable medium for generating throttling parameters for an information technology (IT) management system based on historical event log data, the program product, which when executed by a computer device performs the steps of:
  examining the historical event log data, wherein an event comprises a message issued by an IT resource in accordance with a predefined protocol and identifies throttling candidates by comparing how often the event reoccurs and a measured time period analysis that measures how long of a time frame the event reoccurred with predefined identifier settings, wherein each throttling candidate comprises an event type for a series of redundant events that reoccur over at least one measured time period;
  statistically analyzing event data associated with each throttling candidate and generating a set of throttling parameters for each throttling candidate based on the event data wherein the set of throttling parameters include a throttling window which determines a time frame during which the redundant events are discarded;
  detecting and recording occurrence of the event type and discarding future occurrences of the event type until the throttling window has expired; and
  passing the set of throttling parameters to the IT management system for throttling of a set of new events, based on the throttling parameters.

8. The program product of claim 7, wherein the throttling candidates are identified by examining the inter-arrival time of redundant events.

9. The program product of claim 7, wherein the throttling candidates are identified by examining the at least one measured time period during which redundant events reoccur.

10. The program product of claim 7, wherein at least one throttling candidate comprises a redundant event that reoccurs over a plurality of different measured time periods.

11. The program product of claim 7, wherein the event data associated with each throttling candidate includes:
   the at least one measured time period during which a redundant event occurs, and
   an inter-arrival time of the redundant events occurring during each at least one measured time period.

12. The program product of claim 7, wherein the throttling parameters for each throttling candidate comprise an event type and a throttling window.

13. An information technology (IT) management system, comprising:
   a database for storing historical event log data;
   an identification system that examines the historical event log data, wherein an event comprises a message issued by an IT resource in accordance with a predefined protocol and identifies throttling candidates based on how often the event reoccurs and a measured time period analysis that measures how long of a time frame the event reoccurred with predefined identifier settings, wherein each throttling candidate comprises an event type for a series of redundant events that reoccur over at least one measured time period;
   an analysis system that statistically analyzes event data associated with each throttling candidate and generates a set of throttling parameters for each throttling candidate based on the event data wherein the set of throttling parameters include a throttling window which determines a time frame during which the redundant events are discarded;
   a throttling system detecting and recording occurrence of the event type and discarding future occurrences of the event type until the throttling window has expired; and
   a system passing the set of throttling parameters to the IT management system for throttling of a set of new events, based on the throttling parameters.

14. The IT management system of claim 13, wherein the throttling candidates are identified by examining the inter-arrival time of redundant events.

15. The IT management system of claim 13, wherein the throttling candidates are identified by examining a length of the at least one measured time period during which redundant events occur.

16. The IT management system of claim 13, wherein at least one throttling candidate comprises an event type that reoccurs over a plurality of different measured time periods.

17. The IT management system of claim 13, wherein the event data associated with each throttling candidate includes the at least one measured time period during which a redundant event occurs, and an inter-arrival time of the redundant events occurring during each at least one measured time period.

18. The IT management system of claim 13, wherein the throttling parameters for each throttling candidate comprise an event type and a throttling window.

19. The IT management system of claim 13, wherein identification system includes identifier settings that control selection of throttling candidates.

* * * * *